Patented Apr. 22, 1952

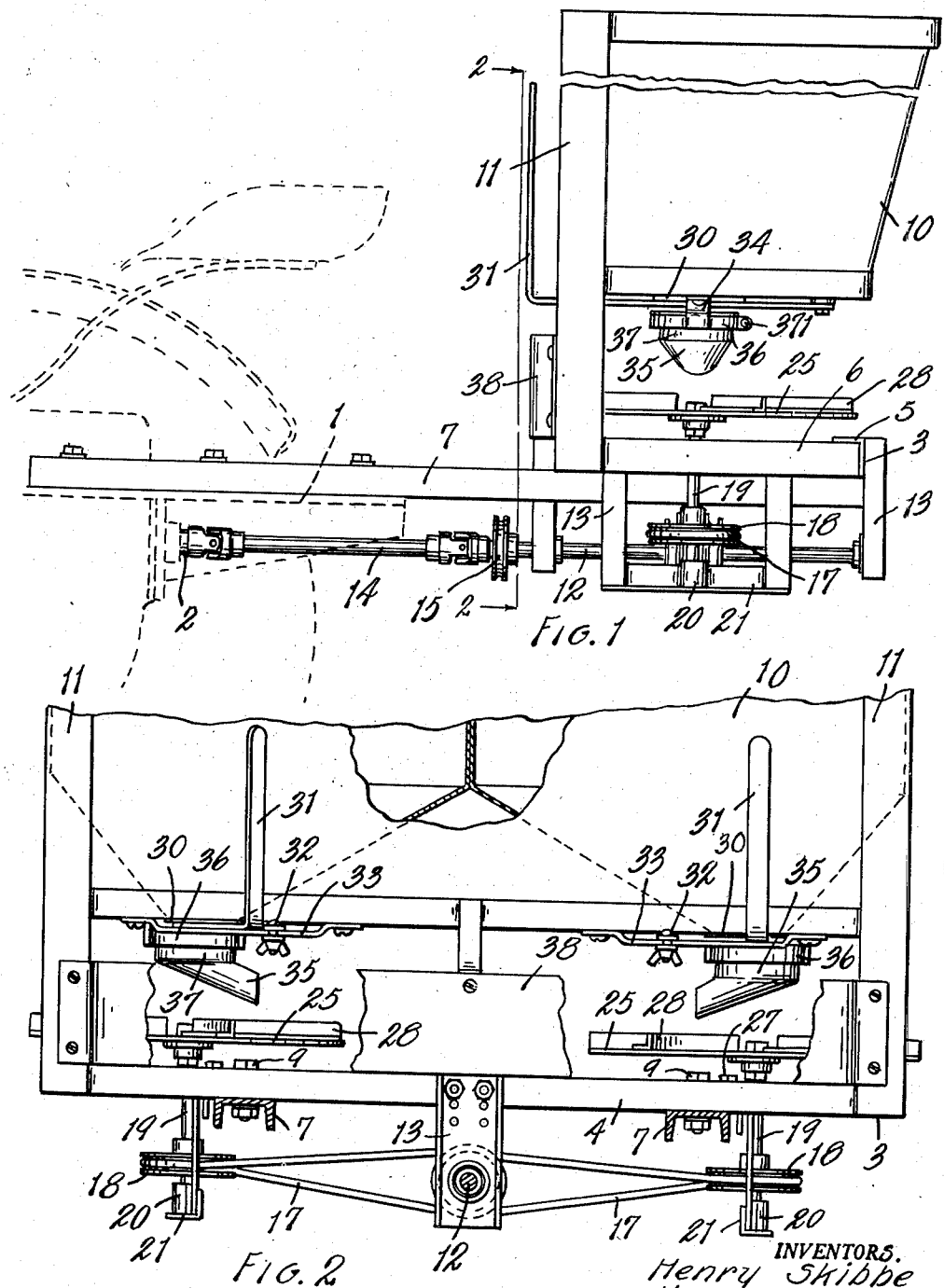

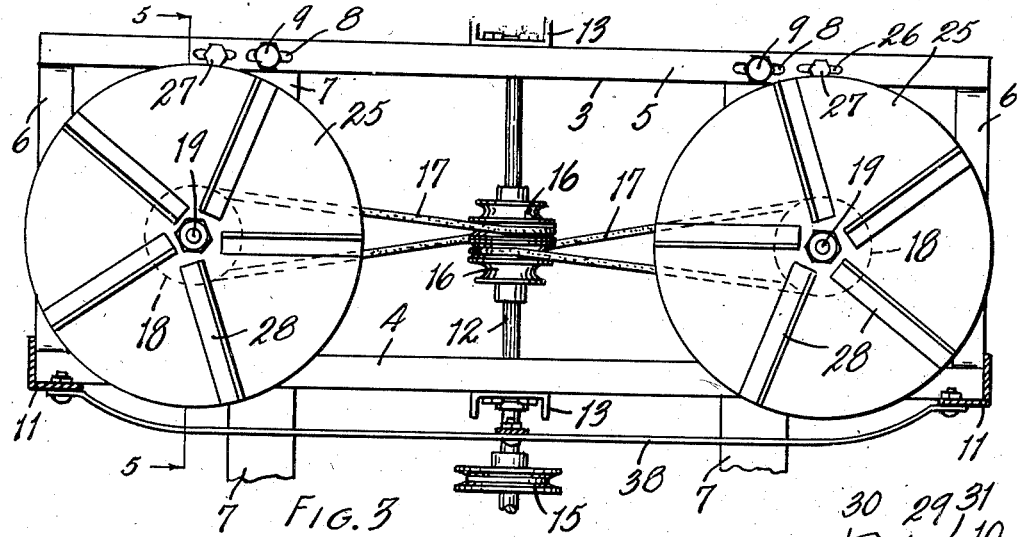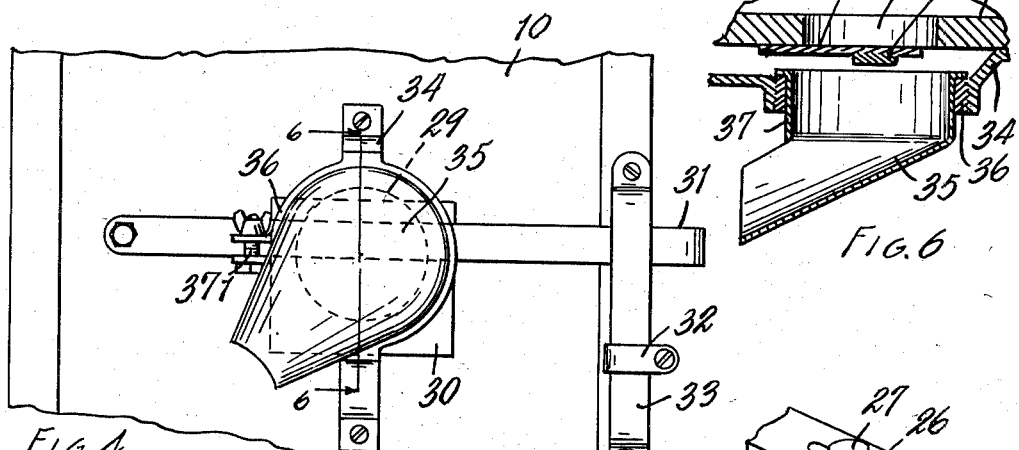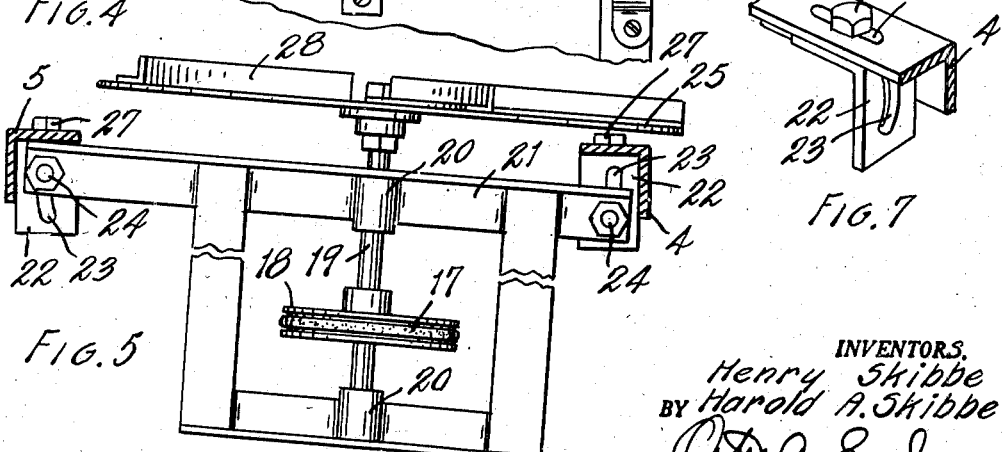

2,594,084

UNITED STATES PATENT OFFICE 2,594,084

SEED AND FERTILIZER SPREADER

Henry Skibbe and Harold A. Skibbe, Eau Claire, Mich.

Application April 29, 1946, Serial No. 665,750

7 Claims. (Cl. 275—8)

The main objects of this invention are:

First, to provide a distributer for seed and fertilizer which is adapted to be mounted on a tractor and effectively distributes the material under widely varying conditions, for example in orchards and vineyards.

Second, to provide a machine of the class described which can be readily adjusted to control the strip or area covered and the amount of material distributed.

Third, to provide a structure in which these various adjustments or adaptations can be easily and quickly made.

Objects relating to details and economies of the invention will appear from the description to follow. The invention is defined and pointed out in the claims.

A preferred embodiment of the invention is illustrated in the accompanying drawing, in which:

Fig. 1 is a fragmentary side elevation of a machine embodying our invention mounted on a tractor, fragments of which are indicated by dotted lines.

Fig. 2 is a fragmentary front elevation partially in section on line 2—2 of Fig. 1.

Fig. 3 is a fragmentary horizontal section with the hopper and its supporting parts and the feed spouts omitted.

Fig. 4 is an enlarged fragmentary inverted view showing the relation of the feed spout to the hopper.

Fig. 5 is a fragmentary view in section on a line corresponding to line 5—5 of Fig. 3 showing the details of the adjustable support for the distributers.

Fig. 6 is a fragmentary view in section on line 6—6 of Fig. 4.

Fig. 7 is a fragmentary perspective view showing details of the mounting for the distributer.

In the accompanying drawings, 1 represents parts of the frame of a tractor and 2 the power take-off shaft thereof. The frame designated generally by the numeral 3 comprises transverse front and rear members 4 and 5 and connecting end cross pieces 6. This frame is carried by the supporting bars 7 attached to the frame of the tractor. The frame transverse bars are longitudinally slotted at 8 to receive the attaching bolts 9 providing for variations in tractor structure or in the lowering of the bar 7 on the tractor.

The hopper 10 is mounted on the uprights 11 on the front corners of the frame so that the hopper is supported in overhanging relation to the frame.

A driving shaft 12 is suspended from the frame by the hangers 13 and is connected to the power take-off shaft 2 by the intermediate shaft 14. The shaft 12 is, in the embodiment illustrated, provided with a take-off pulley 15. The driving shaft is provided with sets of stepped driving pulleys 16 with which the driving belts 17 may be selectively engaged, these driving belts coacting with pulleys 18 on the distributer shafts 19.

These distributer shafts are vertically arranged in bearings 20 carried by the adjustable supports 21—that is, the supports 21 are adjustably mounted on the brackets 22 on the frame, the brackets having vertical slots 23 receiving the bolts 24 so that the shaft supporting frames may be tiltingly adjusted to tilt the distributer 25 mounted on the upper ends of the shaft. The brackets 22 are adjustably mounted on the frame, the frame being provided with slots 26 receiving the bracket securing bolts 27. This enables the adjustment of the belts and the proper tensioning of the belts for variable speed drive and also permits the belts being arranged in cross relation or in straight relation to change the direction of drive of the distributer disk. The distributer disks are provided with radially disposed vanes 28.

The hopper is provided with two discharge openings 29 controlled by the slide valves 30, the handles 31 of which are disposed in the front of the hopper to be manipulated by the driver of the tractor. Adjustable stops 32 are provided for the valves, these stops being mounted on the bars or straps 33.

On the under side of the hopper we provide supports 34 for the discharge spouts 35. The supports are provided with a split portion 36 receiving the cylindrical portion 37 of the spouts whereby the spouts may be rotatably adjusted to vary their point of delivery to the distributers. The bolts 371 clamp the parts of the support upon the spouts in their adjusted position. The spouts 35 are thus adjustable to deliver material to be spread to any of the four quadrant positions of the distributors 25. That is, while the distributors rotate they may be considered as having four quadrant positions lying at the front right and left and at the back right and left of cardinal axes of the distributors extending longitudinally and transversely of the frame 3. The spouts 35 will deliver into any of these quadrant positions.

A guard 38 is arranged in front of the distributers to prevent the material discharged from being thrown against the tractor or the hopper on the tractor.

With the parts thus arranged, the distributers may be tilted as shown in Fig. 5 in either direction; that is, forwardly or rearwardly or adjusted to a horizontal position. This adjustment varies the throw of the material distributed and the amount of which is varied by the valves. The throw is further controlled by the adjustment of the spouts to vary the point of delivery of the material to the distributers in relation to the direction of rotation of the distributors. The distributors may be driven at different speeds and in either direction. This provides a very wide range of adaptation and assures effective distribution of the material such as seed or fertilizer under varying conditions.

As stated, the structure is highly desirable for use in orchards and vineyards and other places where the control of distribution as to area covered and the like is highly important.

We have illustrated and described our invention in a highly practical embodiment thereof. We have not attemped to illustrate various adaptations which we contemplate as it is believed that this disclosure will enable those skilled in the art to embody or adapt our invention as may be desired.

Having thus described our invention, what we claim as new and desire to secure by Letters Patent, is:

1. A spreader machine comprising a supporting frame, a hopper on said frame and having a discharge opening, a generally horizontal but tiltably adjustable distributor disk supported on said frame below said hopper, and a delivery spout supported from said frame and positioned between said opening and said disk, said spout being horizontally rotatably adjustably mounted approximately over the center of said disk for approximately 360° angular adjustment and having a discharge mouth disposed laterally of the axis of rotation of said spout whereby the point of delivery of said spout to said disk may be adjusted angularly completely about the axis of rotation of said disk.

2. A spreader machine comprising a supporting frame, a hopper on said frame and having a discharge opening, a generally horizontal distributor disk supported on said frame below said hopper, and a delivery spout supported from said frame and positioned between said opening and said disk, said spout being horizontally rotatably adjustably mounted approximately over the center of said disk for approximately 360° angular adjustment and having a discharge mouth disposed laterally of the axis of rotation of said spout whereby the point of delivery of said spout to said disk may be adjusted angularly completely about the axis of rotation of said disk.

3. A spreader attachment for a tractor comprising, a pair of longitudinally extending bars adapted to be mounted on the tractor, a generally rectangular main frame having front and rear cross members supported on the rear ends of said bars, a longitudinal drive shaft supported from said cross members between said bars and adapted to be connected to the power take-off shaft of the tractor, a hopper supported by said main frame and located in spaced relationship thereabove, said hopper having two transversely spaced discharge openings in its bottom, a pair of generally vertical frames having longitudinally extending top members, angle shaped brackets having arms vertically adjustably secured to said top members and other arms transversely adjustably secured to said cross members for vertical tilting and lateral swinging adjustment of said vertical frames relative to said main frame, generally vertical distributor shafts rotatably mounted on and adjustable with said vertical frames and having driven pulleys thereon, sets of stepped driving pulleys mounted on said drive shaft, belts selectively connectible between said stepped pulleys and said driven pulleys for reversibly driving said distributor shafts, a distributor disk secured to the top of each distributor shaft and located approximately under said discharge openings, and delivery spouts horizontally rotatably secured to the bottom of said hopper underneath said openings to receive material from said hopper and having discharge mouths disposed laterally of the axes of rotation of said spouts for delivering material at selected positions completely around said distributor disks.

4. A spreader attachment for a tractor comprising, a pair of longitudinally extending bars adapted to be mounted on the tractor, a generally rectangular main frame having front and rear cross members supported on the rear ends of said bars, a longitudinal drive shaft supported from said cross members between said bars and adapted to be connected to the power take-off shaft of the tractor, a hopper supported by said main frame and located in spaced relationship thereabove, said hopper having two transversely spaced discharge openings in its bottom, a pair of generally vertical frames having longitudinally extending top members, brackets adjustably securing said top members to said cross members, part of said brackets having vertically adjustable connections to said vertical frames and part of said brackets having transversely adjustable connections to said cross members for vertical tilting and lateral swinging adjustment relative to said main frame, generally vertical distributor shafts rotatably mounted on said vertical frames and having driven pulleys thereon, sets of stepped driving pulleys mounted on said driving shaft, belts selectively connectible between said stepped pulleys and said driven pulleys for reversibly driving said distributor shafts, a distributor disk secured to the top of each distributor shaft and located approximately under said discharge openings, and delivery spouts horizontally rotatably secured to the bottom of said hopper underneath said openings to receive material from said hopper and having discharge mouths disposed laterally of the axes of rotation of said spouts for delivering material at selected positions completely around said distributor disks.

5. A spreader attachment for a tractor comprising, a generally horizontal main frame having front and rear cross members and adapted to be mounted on a tractor, a longitudinal drive shaft supported from said cross members and adapted to be connected to the power take-off shaft of the tractor, a hopper supported by said main frame and located in spaced relationship thereabove, said hopper having two transversely spaced discharge openings in its bottom, a pair of generally vertical frames having longitudinally extending top members, brackets adjustably securing said top members to said cross members, part of said brackets having vertically adjustable connections to said vertical frames and part of said brackets having transversely adjustable connections to said cross members for vertical tilting and lateral swinging adjustment of said vertical frames relative to said main frame, generally vertical distributor shafts rotatably mounted on said vertical frames and having driven pulleys thereon, driving pulleys mounted on said driving shaft, belts selectively connectible between said driving pulleys and said driven pulleys for driving said distributor shafts, a distributor disk secured to the top of each of said distributor shafts and located approximately under said discharge openings, and delivery spouts horizontally rotatably secured to the bottom of said hopper underneath said openings to receive material from said hopper and having discharge mouths disposed radially of the axes of rotation of said spouts for delivering material at selected positions completely around said distributor disks.

6. A spreader machine comprising, a supporting frame adapted to be translated longitudinally over the ground, a pair of generally vertical shafts mounted in laterally spaced relation on said frame and tiltably adjustable in vertical planes extending longitudinally of said frame, a pair of distributor disks mounted one on each shaft for rotation about the axes thereof, a hopper structure mounted on said frame in vertically spaced relationship over said disks, a pair of discharge spouts opening from the bottom of said hopper structure and positioned approximately over said shafts, said spouts being horizontally rotatably adjustably supported from said frame for rotation through 360°, said spouts having discharge openings spaced materially radially from their axes of rotation whereby the spouts will discharge onto selected portions of said disks angularly disposed completely around said disks, and a driving element carried by said frame and reversibly drivingly connectable to said disks.

7. A spreader machine comprising, a supporting frame adapted to be translated longitudinally over the ground, a pair of generally vertical shafts mounted in laterally spaced relation on said frame and tiltable adjustable in vertical planes extending longitudinally of said frame, a pair of distributor disks mounted one on each shaft for rotation about the axis thereof, a hopper structure mounted on said frame in vertically spaced relationship over said disks, a pair of discharge spouts opening from the bottom of said hopper structure and positioned approximately over said shafts, said spouts being horizontally rotatably adjustably supported from said frame for rotation through arcs in excess of 270°, said spouts having discharge openings spaced materially radially from their axes of rotation whereby the spouts will discharge onto selected portions of said disks angularly disposed in each of the four quadrant positions of said disks, and a driving element carried by said frame and drivingly connectable to said disks.

HENRY SKIBBE.
HAROLD A. SKIBBE.

REFERENCES CITED

The following references are of record in the file of this patent:

UNITED STATES PATENTS

| Number | Name | Date |
|---|---|---|
| 921,101 | Griswold | May 11, 1909 |
| 1,619,795 | Roby | Mar. 1, 1927 |
| 1,767,017 | Scheckler | June 24, 1930 |
| 2,044,652 | Walker | June 16, 1936 |
| 2,065,361 | Blake | Dec. 22, 1936 |
| 2,162,689 | Mayfield | June 30, 1939 |
| 2,323,262 | Warren | June 29, 1943 |
| 2,334,376 | Bauer | Nov. 16, 1943 |
| 2,418,271 | Meincke | Apr. 1, 1947 |

FOREIGN PATENTS

| Number | Country | Date |
|---|---|---|
| 13,249 | Great Britain | June 11, 1902 |
| 57,630 | Denmark | May 14, 1940 |
| 476,204 | France | Apr. 26, 1915 |